Dec. 25, 1951  V. E. CARBONARA ET AL  2,579,902
INSTRUMENT FOR CORRELATING AIR SPEED, ANGLE
OF ATTACK AND AIRCRAFT LOADING
Filed Aug. 4, 1945  3 Sheets-Sheet 2

INVENTOR.
Victor E. Carbonara.
John H. Andresen Jr.
ATTORNEY.

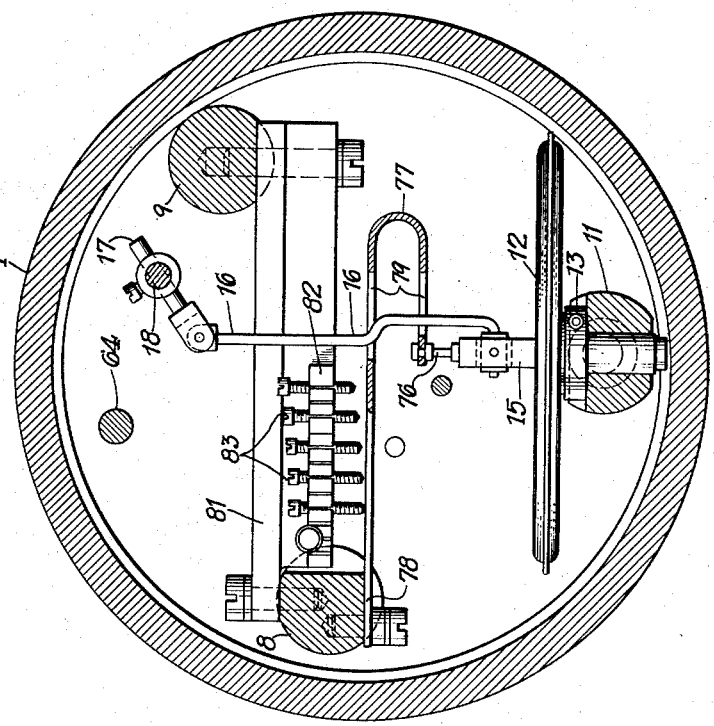
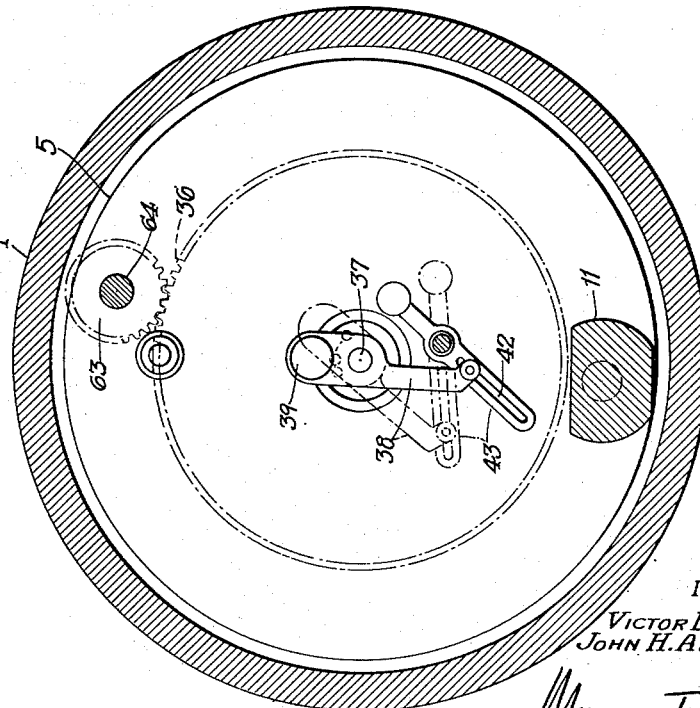

Patented Dec. 25, 1951

2,579,902

UNITED STATES PATENT OFFICE 2,579,902

INSTRUMENT FOR CORRELATING AIR SPEED, ANGLE OF ATTACK, AND AIRCRAFT LOADING

Victor E. Carbonara, Manhasset, and John H. Andresen, Jr., Port Washington, N. Y., assignors, by mesne assignments, to Kollsman Instrument Corporation, Elmhurst, N. Y., a corporation of New York Application August 4, 1945, Serial No. 608,972

16 Claims. (Cl. 73—178)

This invention relates to flight aids for aircraft and more particularly to an instrument providing indications of aircraft airspeed, angle of attack and/or percent load.

An object of the invention is to provide an aircraft instrument which shall continuously register the indicated airspeed of the aircraft and the angle of attack at which it is operating and which shall indicate the relationship which will exist between other values of indicated airspeed and angle of attack.

Another object of the invention is the provision of an aircraft instrument having stationary and movable dials bearing indicia of indicated airspeed and angle of attack with a single pointer cooperating with both indicia to indicate the values of airspeed and angle of attack at which the aircraft is operating in which the indicia may be read with relation to each other to indicate the relation between other values of airspeed and angle of attack.

Another object of the invention is to provide a combined airspeed and angle of attack indicating instrument in which the airspeeds for various values of angle of attack may be directly read.

Another object of the invention is the provision of an aircraft instrument providing a direct reading of percent load as a product of the gross load and the G load under which the aircraft is operating.

Another object of the invention is the provision of an aircraft instrument which under conditions of straight level flight will indicate the loading of the aircraft.

Another object of the invention is the provision of an aircraft instrument which shall continuously indicate the airspeed, angle of attack, and percent load of an aircraft.

Other objects and features of the invention will be readily apparent to those skilled in the art from the specification and appended drawings illustrating certain preferred embodiments in which:

Figure 4 is a sectional view on the line IV—IV of Figure 1.

Figure 5 is a sectional view on the line V—V of Figure 1.

Figure 1:
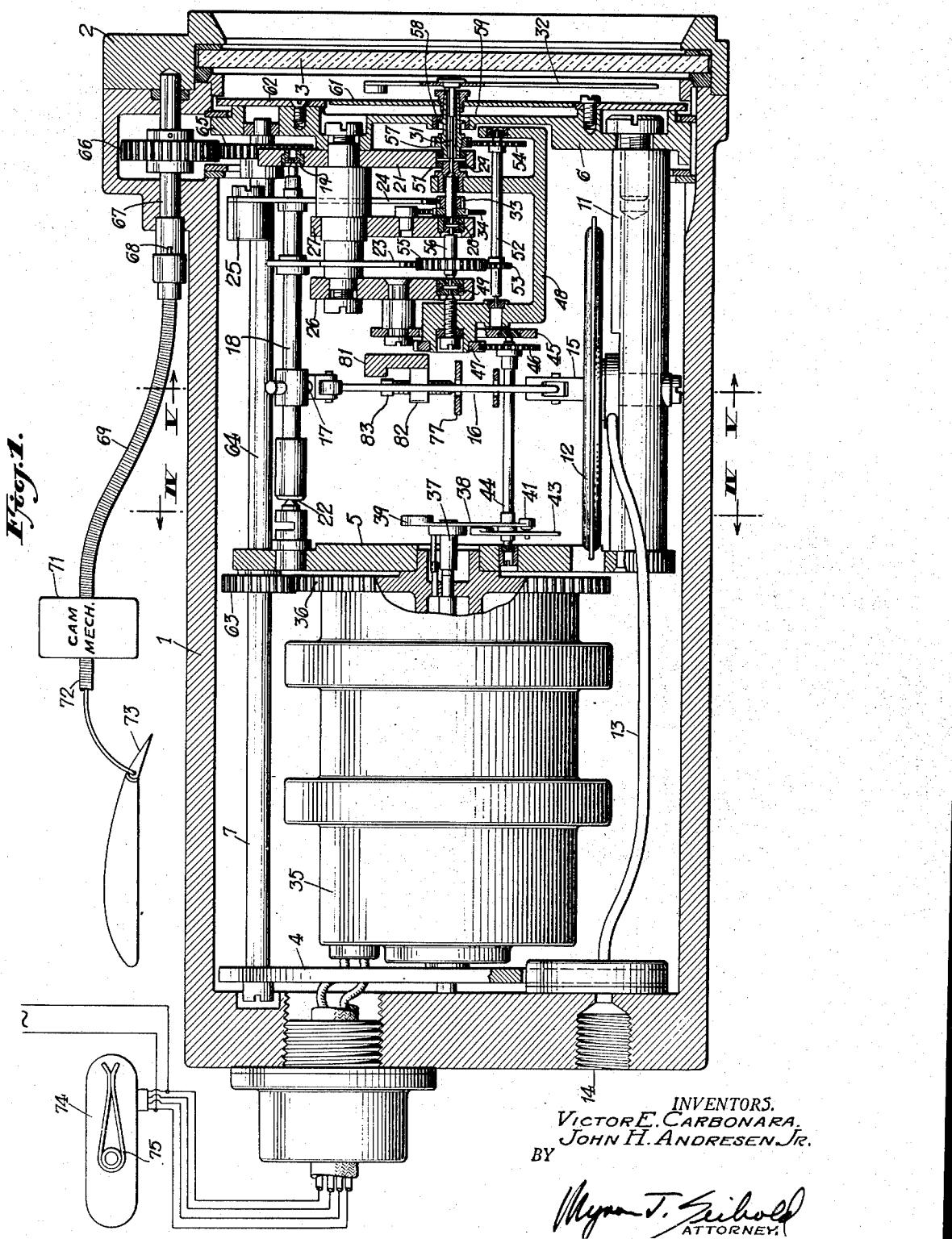
Figure 1 is a longitudinal sectional view through a combined instrument according to the present invention with certain of the parts rotated into the plane of the drawing for simplicity of disclosure and with certain of the parts shown in elevation and with diagrammatic representations of the element responsive to angle of attack and of a wing flap modifier for the instrument.

The instrument according to the present invention embodies a cup shaped main body portion 1 with a cover 2 therefor provided with a transparent window plate 3 through which the dials and pointer of the instrument may be viewed. The body portion 1, cover 2 and window 3 are mounted together in sealed relation to provide an airtight enclosure which is connected to the static outlet of a Pitot static tube, not shown. The operating parts of the instrument are mounted upon three spaced stationary frame plates 4, 5 and 6, the plates 4 and 5 being connected together by a plurality of elongated rods 7, only one of which is shown, and the plates 5 and 6 being connected together in spaced relation by a plurality of rods 8, 9 and 11. Upon the rod 11 there is mounted a diaphragm capsule 12 connected by tubing 13 to an opening 14 in the rear wall of the main body portion 1, the opening 14 being adapted to be connected to the Pitot opening of the Pitot static tube to place the interior of capsule 12 in communication therewith.

The upper surface of the aneroid capsule 12 is provided with a boss 15 connected, through a link 16, to an arm 17 on a rockshaft 18. The rockshaft 18 is pivoted at one end, at 19, in a bearing in a stationary plate 21 rigidly mounted upon the frame plate 6 and at its opposite end, at 22, in an adjustable bearing mounted on the frame plate 5. The rockshaft 18 carries a pair of gear sectors 23 and 24, the sector 24 having an extension upon which is mounted a counterweight 25.

Rigidly supported on the frame plate 6 are additional stationary supporting plates 26, 27. Pivotally mounted in bearing 28 in supporting plate 27 and in bearing 29 in supporting plate 21 is a shaft 31 carrying at its forward end a pointer 32. Rigid with the shaft 31 is a gear wheel 33 with which the sector 24 meshes to provide for direct rotation of the pointer 32 in response to rotation of the rockshaft 18. A light spiral spring 34 biases the shaft 31 to take up any backlash in the gearing connection.

Between the plates 4 and 5 there is disposed a self-synchronous receiver 35, the stator body of which is pivotally mounted within the plates for rotation bodily about its longitudinal axis, the body portion of the stator being provided with a gear wheel 36 for this purpose. The rotor shaft of the self-synchronous receiver 35 is indicated at 37 and carries a lever 38 rigidly movable therewith and provided with a counterweight at 39. The lever 38 has at one end a pin 41 received within a slot 42 in a lever 43 mounted on a shaft 44 pivoted in bearings in frame plate 5 and in an auxiliary supporting plate 45 rigidly mounted upon the plate 26.

Upon the shaft 44 is a pinion 46 meshing with a gear wheel 47 rigid with the hub of a rotatable frame 48. The frame 48 is pivoted for rotation in bearings 49 and 51 mounted in supporting plates 26 and 21, respectively, the frame 42 rotating about an axis coincident with the axis of the pointer shaft 31. Within the frame 48 is mounted a rotatable shaft 52 carrying a pair of pinions 53 and 54. The pinion 53 meshes with an idler pinion 55 mounted on a shaft 56 rotatable in bearings 49 and 28 in supporting plates 26 and 27 and about an axis coincident with the axis of rotation of the frame 48. The sector 23 on the rockshaft 18 also meshes with the idler pinion 55. The pinion 54 meshes with a gear wheel 57 rigidly mounted on a hollow shaft 58 pivoted in bearing 29 in supporting plate 21 and in bearing 59 in the frame plate 6. The hollow shaft 58 carries at its forward end a rotatable dial plate 61. Upon the supporting frame 6 is rigidly secured a stationary annular dial 62.

Meshing with the ring gear 36 is a pinion 63 mounted upon one end of the shaft 64 rotatable in bearings carried by the frame plates 5 and 6. The opposite end of the shaft 64 is provided with a pinion 65 meshing with a gear 66 carried on a shaft 67 pivoted in the main body portion 1 and provided exteriorly thereof with a key connection at 68. The connection 68 leads through a flexible shaft 69 to a cam mechanism 71, diagrammatically illustrated, which is actuated by a flexible shaft 72 connected to and rotatable with a flap 73 on the aircraft wing.

At the upper left hand corner of Figure 1 there is diagrammatically illustrated a self-synchronous transmitter 74 whose rotor is connected to be moved by a wind vane 75 located on the aircraft so as to be disposed in the air flow. The output of the transmitter 74 is connected by wiring, as shown, to the receiver 35 so that the position of the rotor of the receiver is determined by the position of the transmitter rotor which is moved by the wind vane 75 responsive to the angle of attack of the aircraft. The internal leads to the receiver 35 are flexible to permit a limited rotation of the receiver stator for the wing flap correction.

An adjustment is provided within the instrument for the movement of the diaphragm capsule 12 to secure the proper scale for the airspeed indication. This adjustment is more particularly shown in Figure 1 and in the section of Figure 5. The hub 15 of the diaphragm capsule 12 is connected by a link 76 to one end of a return bent loading spring 77 mounted at its opposite end, at 78, to the rod 8. The two legs of the spring element 77 are provided with openings 79 through which the link 16 passes freely. Between the rods 8 and 9 is rigidly mounted a support 81 carrying a shelf 82 in which are threaded a plurality of adjusting screws 83 whose projecting ends are adapted to be engaged by the spring 77 in its upward movement to determine the loading of the spring element on the diaphragm capsule 12. By the adjustment of the screws 83 the desired movement of the diaphragm capsule for a given internal pressure may be determined.

Figure 2:
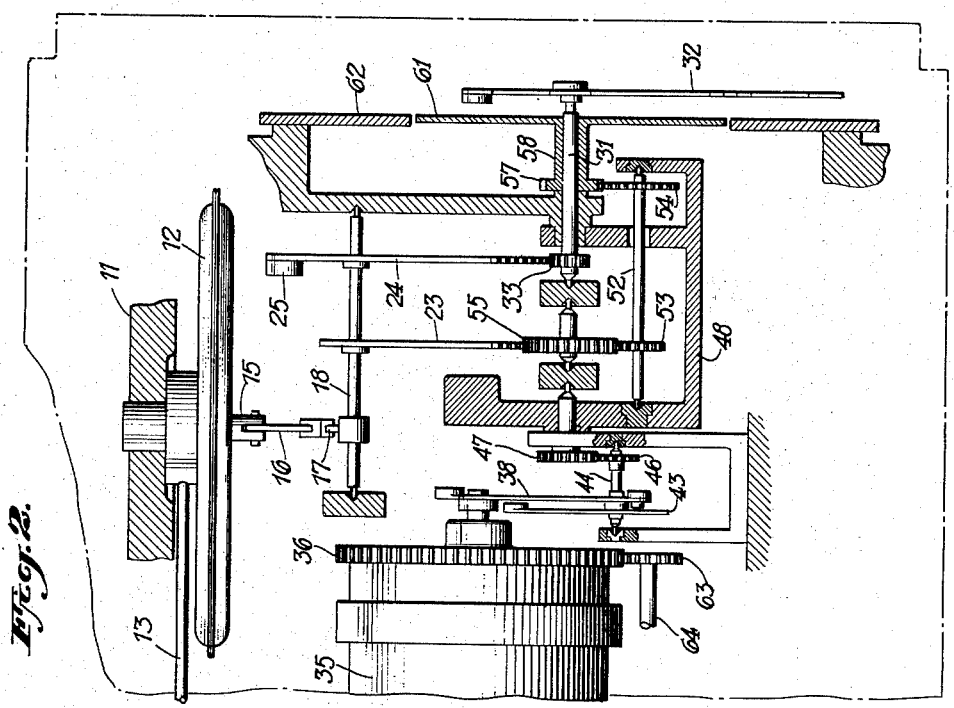
Figure 2 is a simplified schematic outline of the salient parts of the combined instrument.

In Figure 2 the salient parts of the combined instrument have been diagrammatically shown for simplicity of understanding and like reference numerals to those used in Figures 1, 4 and 5 have been used where applicable.

Figure 3:
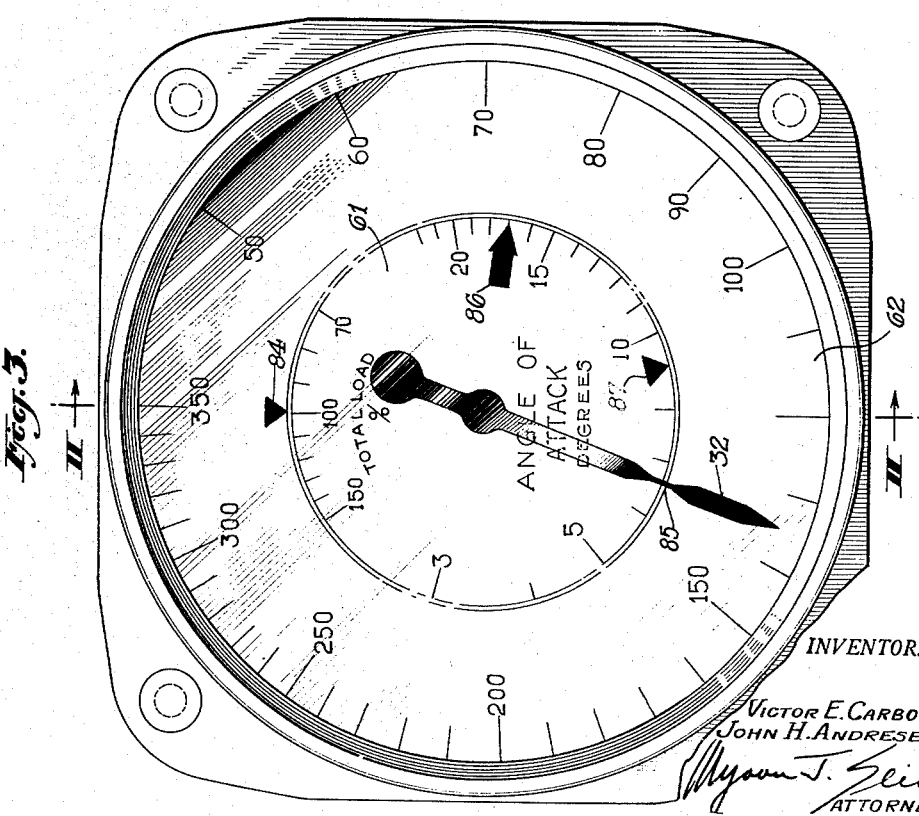
Figure 3 is a front elevational view of the instrument showing the dials and pointer.

In the front elevational view of Figure 3 the instrument is shown with the stationary dial 62 provided with indicia of airspeed and with the rotatable dial 61 provided with indicia of angle of attack and percent total load. An index 84 is provided on the dial 62 with relation to which the percent total load is read. The pointer 32 has the usual index at its end with respect to which the indicia of airspeed may be read and is also provided with a necked portion at 85 with respect to which the indicia of angle of attack may be read. Permanent salient markings are provided on the rotatable dial 61 at values of angle of attack for particular operational characteristics and the corresponding air speeds may be directly read on the dial 62 opposite the markings. These salient markings may be any desired for the pilot's use, the ones selected being the stalling point and the maximum ratio of lift to drag, the marking at 86 indicating stall and that at 87 indicating the maximum ratio of lift to drag.

The instrument according to the present invention is not of universal application to all types of aircraft, but must be designed for the operational characteristics of each type of aircraft with which it is used. In the development of the instrument, an aircraft is flown at 100% load to secure the values of indicated airspeed and angle of attack at desired operational points such as (1) stall, (2) best ratio of lift to drag and (3) cruising. The angle of attack readings may be taken from any desired base such as wing chord, longitudinal axis of the plane, or other desired base line. A formula of the form:

$$\text{airspeed } x \text{ (angle of attack} + c)^n = K$$

is solved for values of $c$ and $n$ so as to fit the three points above mentioned. In this formula the value of $c$ is determined by a theoretical baseline with relation to which the angle of attack is measured, K is a constant determined by the units in which airspeed and angle of attack are measured and by the values of $c$ and $n$, and $n$ is a known constant determined by test for a given aircraft design.

The stationary annular dial 62 is then calibrated in units of airspeed to a logarithmic scale using a base or length to substantially cover the dial over the range desired. The movement of the diaphragm capsule 12 to secure a rotation of the pointer 32 in conformance with the logarithmic scale is attained through adjustment of the screws 83 to determine the loading of the spring element 77 upon the diaphragm capsule. The angle of attack indicia are then placed upon the rotatable dial 61 in a logarithmic scale to a base or length determined by the value of $n$ in the above formula in which the base of the angle of attack scale is $1/n$ of the base of the airspeed scale. The value of $c$ determined in the formula compensates for the base line with relation to which the angle of attack was measured and the location of the angle of attack indicia finally to be disposed with relation to the airspeed indicia in the instrument is the summation of angle of attack plus $c$ rather than the experimentally measured values. As the load of lift characteristics of a plane vary substantially as the square of the airspeed, the scale for percent total load is a logarithmic scale to a base one-half the base of the logarithmic scale for the airspeed indicia. The final adjustment of the relative position of the dials 61, 62 can either be regulated in the instrument or more conveniently by the location vane 75 on the rotor shaft of the transmitter 74. The pin and slot connection between the levers 38 and 43 provides a proper movement of the rotatable dial 61 for the logarithmic scale indicia used thereon.

In the operation of the instrument according to the present invention, the rotatable dial 61 will not move except upon change in the loading of the aircraft, this being indicated in terms of percent total load and being the product of the gross load and G load. Hence, by the position of the percent total load indicia with respect to the index 84 an indication is given of the aircraft loading. The angle of attack and airspeed of the aircraft may be read with relation to the pointer 32 and the airspeed for any given angle of attack or, conversely, the angle of attack for any given airspeed, may be read directly by the relation between the angle of attack indicia on dial 61 and the airspeed indicia on dial 62. Thus, in normal flight of the aircraft, the pilot can read directly the stalling speed of the aircraft, the most economical speed for best ratio of lift to drag, or any other airspeed at which to fly for a desired angle of attack. These values will remain the same until the load on the aircraft changes, in which case, the rotatable dial 61 will move to establish a new relation between angle of attack and airspeed.

In the operation of the aircraft at a constant loading, a change in airspeed will be accompanied by a change in the angle of attack. The change in airspeed will cause a movement of the diaphragm capsule 12 which will be reflected through link 16 and arm 17 in a rotation of the rockshaft 18. Rotation of the rockshaft 18 will rotate sectors 23 and 24, sector 24 rotating gear wheel 33 to rotate shaft 31 and pointer 32. As the angle of attack changes with this change in airspeed, the position of the vane 75 will change to move the rotor of transmitter 74. This, in turn, effects movement of the rotor of receiver 35 to rotate shaft 37 and lever 38 thereon. Through the pin 41 and slot 42 lever 38 rotates lever 43 and the shaft 44 on which it is mounted. Rotation of shaft 44, through engagement of the pinion 46 and ring gear 47, effects rotation of the frame 48. The rotation of frame 48 is accompanied by rotation of the shaft 52 carrying the pinions 53 and 54. The idler pinion 55 is rotated by the movement of sector 23 through rockshaft 18 and the pinion 54 rolls about the gear wheel 57 without effecting rotation of hollow shaft 58 and accordingly the dial 61 remains stationary. The gear ratios between the pinions 53 and 55 and between pinion 54 and gear wheel 57 and the relation of the levers 38 and 43 in their pin and slot connection are determined by the angle of attack, airspeed characteristics so that the proper movements are effected through the differential constituted by the rotatable frame element to maintain the dial 61 stationary until a loading change occurs.

Upon change in the loading of the aircraft, the relationship between angle of attack and airspeed changes so that relative movement between the dials 61 and 62 is required. Assuming a change in load while maintaining constant airspeed, the angle of attack vane 75 will move to effect rotation of the shaft 37 which, through the levers 38 and 43, will rotate shaft 44 to effect rotation of the frame 48 through the engagement of pinion 46 and ring gear 47. The pinion 55 is maintained stationary by its engagement with the sector 23 and the rotation of the shaft 52 occasioned by rotation of the frame 48 will, through the differential gearing between pinions 53, 55 and pinion 55 and ring gear 57 effect rotation of gear 57 and hollow shaft 58 upon which it is mounted to rotate the dial 61.

As a further explanation of the operation of the instrument, if it is assumed that a change in load takes place with constant angle of attack then the movement of the diaphragm capsule 12 due to the change in airspeed effects rotation of rockshaft 18 through link 16 and arm 17 to rotate sectors 23 and 24. The frame 48 is now stationary since there has been no change in angle of attack and the rotation of sector 23 is accompanied by rotation of pinion 55 to rotate pinion 53 and shaft 52. The rotation of shaft 52 will, through pinion 54, effect rotation of ring gear 57 and of the hollow shaft 58 and the dial 61 mounted thereon.

In the case of an aircraft equipped with full flaps, the lowering of the flaps will change the relation between the angle of attack and airspeed. To compensate for this, the instrument introduces a correction factor by changing the position of the receiver 35. This is accomplished by connecting the flap 73, or its operating mechanism, through the cam mechanism 71, whose shape will be determined by the particular operating characteristics of the aircraft in question, to flexible shaft 69 to effect rotation of shaft 67 and pinion 66 mounted thereon. Rotation of pinion 66 will, through pinion 65 meshed therewith, effect rotation of shaft 64 and of pinion 63 mounted thereon. The rotation of pinion 63 meshing with the ring gear 36 will effect rotation bodily of the stator of the receiver 35. The rotor of the receiver will follow this rotation of the stator with consequent movement of the rotor shaft 37 and of the train of mechanism responsive to angle of attack to insert in the instrument the proper correction in the angle of attack-airspeed relation which accompanies the use of wing flaps on the aircraft.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. In an aircraft instrument, means providing indicia of indicated airspeed, means providing indicia of angle of attack, means providing indicia of aircraft loading, a pointer, means responsive to the airspeed and angle of attack of the aircraft for producing relative movement between said pointer and said airspeed and angle of attack indicia providing means to indicate the values of airspeed and angle of attack at which the aircraft is operating, and means including a variable ratio transmission means and a differential gearing means for producing relative movement between said airspeed and angle of attack indicia providing means upon change in the relationship between airspeed and angle of attack of the aircraft to indicate a change of aircraft loading at said aircraft loading indicia providing means.

2. In an aircraft instrument, relatively movable dials, a pointer cooperating with said dials, indicia of airspeed on one of said dials, indicia of angle of attack on the other of said dials, indicia of aircraft loading on one of said dials, an index with respect to which said aircraft loading indicia are read, means for effecting relative movement between said pointer and dials to indicate a change in airspeed and angle of attack under constant aircraft loading, and means including a variable ratio transmission means and a differential gearing means for effecting relative movement between said dials only upon a change in aircraft loading.

3. In an aircraft instrument, a pair of concentric, relatively movable dials, indicia of airspeed on one of said dials, indicia of angle of attack on the other of said dials, a pointer cooperating with both of said dials, means including a variable ratio transmission means and a differential gearing means for effecting movement of said pointer and for holding the dials relatively stationary upon change in airspeed and angle of attack under constant loading to indicate by the position of the pointer relative to the indicia the values of airspeed and angle of attack at which the aircraft is operating.

4. In an aircraft instrument, a pair of concentric relatively movable dials, indicia of airspeed on one of said dials, indicia of angle of attack on the other of said dials, a pointer cooperating with both of said dials, means including a variable ratio transmission means and a differential gearing means for effecting movement of said pointer and for holding the dials relatively stationary upon change in airspeed and angle of attack under constant loading to indicate by the position of the pointer relative to the indicia the values of airspeed and angle of attack at which the aircraft is operating, said means effecting relative movement between said dials only upon change in aircraft loading.

5. In an aircraft instrument, a pair of concentric relatively movable dials, indicia of airspeed on one of said dials, indicia of angle of attack on the other of said dials, a pointer cooperating with both of said dials, means including a variable ratio transmission means and a differential gearing means for effecting movement of said pointer and for holding the dials relatively stationary upon change in airspeed and angle of attack under constant loading to indicate by the position of the pointer relative to the indicia the values of airspeed and angle of attack at which the aircraft is operating, indicia of aircraft loading on one of said dials, an index on the other of said dials with respect to which said loading indicia are read, said means effecting relative movement between said dials to indicate a change in aircraft loading.

6. In an aircraft instrument, a stationary dial, a movable dial, a movable pointer cooperating with both of said dials, indicia of airspeed on one of said dials, indicia of angle of attack on the other of said dials, indicia of aircraft loading on one of said dials, an index on the other of said dials with respect to which said aircraft loading is read, means responsive to airspeed condition, means responsive to angle of attack condition, means for moving said pointer only in response to change in said conditions at constant aircraft loading, and means including a variable ratio transmission means and a differential gearing means for effecting relative movement between said dials in response to change in said conditions due to change in aircraft loading.

7. In an aircraft instrument, a stationary dial, a movable dial, indicia of airspeed on one of said dials, indicia of angle of attack on the other of said dials, a movable pointer cooperating with said dials and indicating by its position with relation to the indicia thereon the airspeed and angle of attack of the aircraft, a salient marker on the dial bearing said angle of attack indicia for indicating an operating condition thereof, means including a variable ratio transmission means and a differential gearing means for effecting movement of said pointer alone in response to change in airspeed and angle of attack under constant loading and for affecting movement of said movable dial only in response to change in aircraft loading, said salient marker by its position relative to the airspeed indicia indicating what the airspeed of the aircraft will be at said angle of attack operating condition under said constant aircraft loading.

8. In an aircraft instrument, a stationary dial, a movable dial, indicia of airspeed on one of said dials, indicia of angle of attack on the other of said dials, a movable pointer cooperating with said dials and indicating by its position with relation to the indicia thereon the airspeed and angle of attack of the aircraft, a salient marker on the dial bearing said angle of attack indicia for indicating an operating condition thereof, means for effecting movement of said pointer only in response to change in airspeed and angle of attack under constant loading, said salient marker by its position relative to the airspeed indicia indicating what the airspeed of the aircraft will be at said angle of attack operating condition under said constant aircraft loading, and means including a variable ratio transmission means and a differential gearing means for effecting movement of said movable dial as the aircraft loading changes to indicate the airspeed of the aircraft at the angle of attack operating condition under the changed aircraft loading.

9. In an aircraft instrument, a stationary dial bearing indicia of airspeed thereon, a rotatable dial bearing indicia of angle of attack, a rotatable pointer cooperating with both of said dials, means responsive to changes in airspeed, means responsive to changes in angle of attack, and means including a variable ratio transmission means and a differential gearing interconnecting said means, pointer and rotatable dial, and operating to effect movement of said pointer only in response to change in airspeed and angle of attack under constant aircraft loading and operating to effect movement of said movable dial in response to change in the relationship between airspeed and angle of attack as effected by change in aircraft loading.

10. In an aircraft instrument, a stationary dial bearing indicia of indicated airspeed, a rotatable dial bearing indicia of angle of attack, a rotatable pointer cooperating with both of said dials and indicating by its position with relation to the indicia thereon the airspeed and angle of attack of the aircraft, means responsive to airspeed connected to effect rotation of said pointer, means responsive to angle of attack, and means including a variable ratio transmission means and a differential gearing connecting said airspeed responsive means and angle of attack responsive means to said rotatable dial, said responsive means, variable ratio transmission means and differential gearing operating to maintain said rotatable dial stationary under conditions of constant aircraft loading and to effect rotation thereof as the aircraft loading changes.

11. In an aircraft instrument, means having indicia of aircraft loading, means with respect to which said indicia are read, means responsive to aircraft angle of attack, means responsive to aircraft airspeed, means including a variable ratio transmission means and differential gearing means for maintaining said indicia means and second mentioned means relatively stationary upon change in airspeed and angle of attack without change in the relationship therebetween providing means for effecting relative movement between said indicia means and said second mentioned means when the relationship between airspeed and angle of attack changes upon change in aircraft loading.

12. In an aircraft instrument, a dial calibrated in indicia of aircraft loading, an index with respect to which said dial indicia are read, means responsive to aircraft angle of attack, means responsive to aircraft airspeed, and means including a variable ratio transmission means and a differential gearing means interconnecting said responsive means and operating to maintain said dial and index relatively stationary upon change in air speed and angle of attack without change in aircraft loading and to effect relative movement between said dial and index upon change in the relationship between airspeed and angle of attack occasioned by change in aircraft loading.

13. In an aircraft instrument, means providing indicia of indicated airspeed, means providing indicia of angle of attack, said indicia providing means being supported for relative movement, a pointer, means responsive to the airspeed and angle of attack of the aircraft for producing relative movement between said pointer and said two indicia providing means to indicate by their relative positions the values of airspeed and angle of attack at which the aircraft is operating, and means including a variable ratio transmission means and a differential gearing means for maintaining said indicia providing means stationary relative to each other under conditions of constant aircraft loading regardless of change in airspeed and angle of attack.

14. In an aircraft instrument, means providing indicia of indicated air speed, means providing indicia of angle of attack, said indicia providing means being supported for relative movement, a pointer, means responsive to air speed and angle of attack of the aircraft for producing relative movement between said pointer and said two indicia providing means to indicate by their relative positions the values of air speed and angle of attack at which the aircraft is operating, said indicia by their position indicating their relation to each other under different aircraft operating conditions under constant load, and means including a variable ratio transmission means and a differential gearing means for effecting relative movement between said indicia providing means to change the relationship between said air speed and said angle of attack indicia upon change in aircraft loading.

15. In an aircraft instrument, a stationary dial, a rotatable dial, indicia of airspeed on one of said dials, indicia of angle of attack on the other of said dials, a pointer by means of which said indicia may be read to indicate the values of airspeed and angle of attack at which the aircraft is operating, said indicia indicating by their position their relative values at other operating conditions under the same load, and means including a variable ratio transmission means and a differential gearing means for effecting rotation of said rotatable dial only with change in the loading of the aircraft to indicate the indicia relations under the new loading condition.

16. In an aircraft instrument, relatively movable dials, indicia of airspeed on one of said dials, indicia of angle of attack on the other of said dials, a movable pointer cooperating with both of said dials, means responsive to the airspeed and angle of attack of an aircraft for effecting relative movement of said dials and pointer to indicate by the position of said pointer with relation to the indicia the airspeed and angle of attack at which the aircraft is operating, and means including a variable ratio transmission means and a differential gearing means for maintaining said dials relatively stationary under condition of constant aircraft loading and the indicia indicating by their position their relative values under different aircraft operating conditions at constant load.

VICTOR E. CARBONARA.
JOHN H. ANDRESEN, Jr.

REFERENCES CITED

The following references are of record in the file of this patent:

UNITED STATES PATENTS

| Number | Name | Date |
|---|---|---|
| 1,225,387 | Winters et al. | May 8, 1917 |
| 1,588,178 | Fales | June 8, 1926 |
| 2,085,345 | Trittle et al. | June 29, 1937 |
| 2,112,704 | Mackay | Mar. 29, 1938 |
| 2,132,286 | Carbonara | Oct. 4, 1938 |
| 2,278,219 | Shanley | Mar. 31, 1942 |
| 2,402,618 | Flatt | June 28, 1946 |
| 2,507,367 | Carbonara et al. | May 9, 1950 |